United States Patent
John et al.

(10) Patent No.: US 6,563,722 B1
(45) Date of Patent: May 13, 2003

(54) SYSTEM AND METHOD FOR COMPENSATING FOR LINE IMBALANCES IN LINE COMMUTATED CONVERTERS

(75) Inventors: Vinod John, Schenectady, NY (US); Luis Jose Garces, Niskayuna, NY (US); Peter Claudius Sanza, Schenectady, NY (US); Paul Michael Szczesny, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/703,736

(22) Filed: Nov. 2, 2000

(51) Int. Cl.[7] .............................................. H02H 7/125
(52) U.S. Cl. ........................................ 363/54; 702/72
(58) Field of Search ........................... 363/54; 388/911; 323/217, 283, 207; 307/98, 99; 361/85; 324/86; 331/12, 45; 702/71, 72

(56) References Cited

U.S. PATENT DOCUMENTS 4,669,024 A * 5/1987 Stacey .......................... 361/85
5,198,746 A * 3/1993 Gyugyi et al. ............... 323/207
5,287,288 A * 2/1994 Brennen et al. ............... 363/50

* cited by examiner

Primary Examiner—Shawn Riley
(74) Attorney, Agent, or Firm—Jill Breedlove, Esq.; Robin C. Clark, Esq.; Hunton & Williams

(57) ABSTRACT

A method and system for compensating for line imbalances in line commutated converters. The controller includes a phase-locked loop (PLL) synchronizing tool which receives the line to line voltage signals and generates firing angle and frequency signals used for synchronizing the two input signals. The PLL controller, in addition to the firing angle and frequency signals, also generates signals representative of filtered values of amplitudes for each of the line to line voltage signals. A voltage imbalance compensation processor associated with the bridge firing controller receives the filtered amplitude signals and also a signal representative of the firing sector of the bridge. The voltage imbalance compensation processor generates, based upon the sector signal and the received filtered amplitude signals a amplitude signal used by a current regulator which is compensated for line imbalances present in the line voltage.

26 Claims, 2 Drawing Sheets

SYSTEM AND METHOD FOR COMPENSATING FOR LINE IMBALANCES IN LINE COMMUTATED CONVERTERS

BACKGROUND OF THE INVENTION

The present invention relates generally to devices and systems for controlling and regulating the conversion of power from an AC source to a load, typically a DC motor. More particularly, the present invention relates to devices which control the conduction of controllable rectifier, e.g., thyristor, bridges placed between the source and the motor and, in particular, methods for compensating for inaccuracies caused by line voltage imbalances during power conversion.

Motor control systems of the type described above typically include at least one rectifier bridge connecting the motor windings to alternating voltage supply lines. For a conventional three phase motor, each AC phase line is generally coupled to the motor by a pair of connected thyristors. That is, in a three phase system, six thyristors are required to transfer power from the source to the load, each for one half of each phase. A thyristor, such as a silicon controlled rectifier (SCR), is generally defined as a switchable diode controlled by a gate element. Each thyristor presents a relatively high blocking impedance to the flow of electrical energy until it is forward biased by a trigger current being applied to its gate element. A digital control circuit typically determines the proper time to trigger the thryistors during each half-cycle of the supply line voltage. Once a thyristor is triggered by the application of a predetermined current to its gate, the forward blocking impedance is lowered, thereby permitting the flow of electrical energy through the thyristor in the manner of a diode. Once conduction has been enabled, the thyristor cannot be turned off until the current flowing therethrough is reduced to near zero (i.e., makes a zero crossing).

The amount of power transferred to the motor is controlled by varying the duration of the conduction of the various thyristors. This is done by controlling the firing angle of each thyristor, that is, the point in the AC waveform at which the thyristor is initiated into conduction. The process of switching from thyristor to thyristor is known as commutation. In order to control the firing of the various thyristors, conventional systems incorporate a firing controller, either analog or digital, to control the firing angle of each thyristor.

Although input voltages received by the power converting system are preferably stable and consistent, external disturbances such as an imbalance in the grid voltage introduce undesirable fluctuations in the input voltages. A grid voltage imbalance can be caused by a number of factors such as supply transfer malfunction, neighboring unbalanced loads, and other grid problems. Continued operation of the power conversion system during such circumstances may have several deleterious effects like overloading of the individual phase legs and various additional system components.

Conventional thyristor based power converter applications utilize either preprogrammed values or a single line to line voltage measurement in controlling the firing of the various thyristors. Unfortunately, these methods of firing control permit the introduction of inaccuracies due to line voltage imbalances of the type described above.

Accordingly, there is a need in the art of power control systems for a system and method for accurately compensating for the effects of line imbalances, thereby reducing or preventing the above-described deleterious effects.

BRIEF SUMMARY OF THE INVENTION

The present invention overcomes the problems noted above, and provides additional advantages, by providing a method and system for compensating for line imbalances in line commutated converters. A bridge firing controller receives signals representative of two of the line to line voltages received by the bridge. The controller includes a phase-locked loop (PLL) synchronizing tool which receives the line to line voltage signals and generates firing angle and frequency signals used for synchronizing the two input signals. The PLL controller, in addition to the firing angle and frequency signals, also generates signals representative of filtered values of amplitudes for each of the line to line voltage signals. The PLL controller further incorporates a voltage imbalance compensation algorithm for receiving the filtered amplitude signals and also a signal representative of the firing sector of the bridge. In operation, the voltage imbalance compensation algorithm generates, based upon the sector signal and the received filtered amplitude signals a amplitude signal used by a current regulator which is compensated for line imbalances present in the line voltage.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Figure 1:
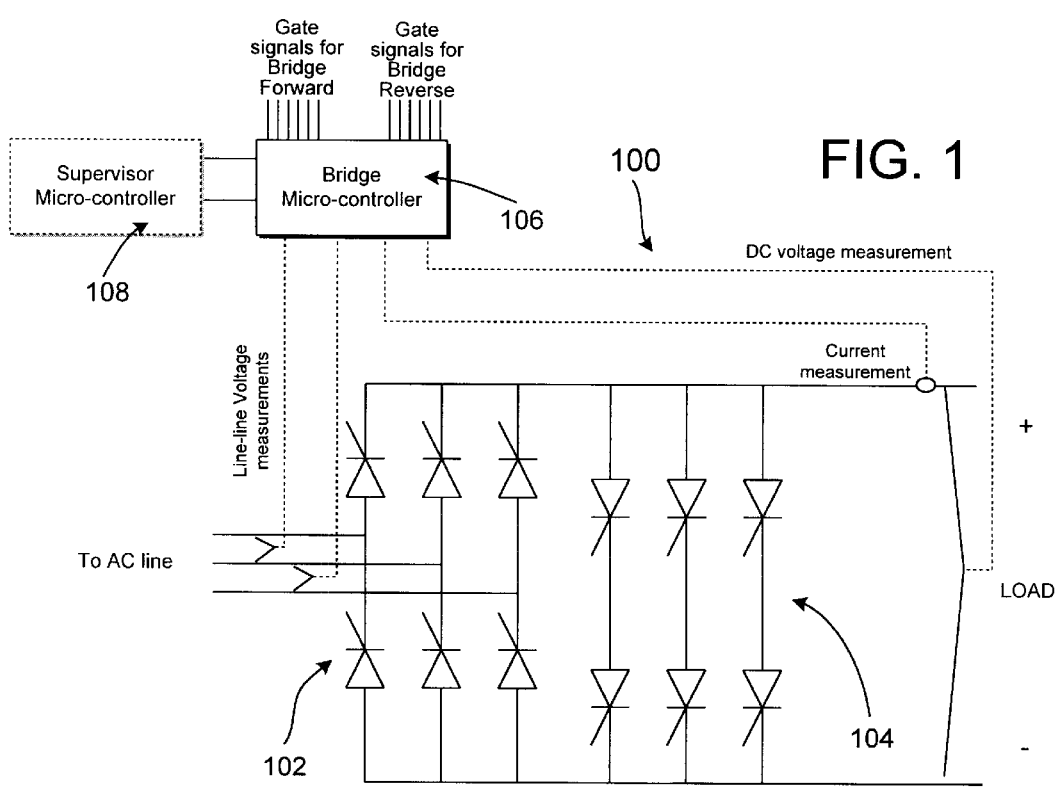
FIG. 1 is a basic block diagram illustrating a thyristor bridge and firing controller system incorporating the method of the present invention.

Referring to the Figures and, in particular, to FIG. 1, there is shown a block diagram illustrating one embodiment of a power conversion apparatus incorporating the voltage imbalance compensation system of the present invention. In particular, forward and reversing thyristor bridges 102 and 104 are connected between an AC source (either a single or a polyphase source) and a load in the manner described above. Bridge firing controller 106 and supervisor controller 108 are electronically connected to the system for controlling the firing of the bridges 102 and 104. In accordance with one embodiment of the present invention, the bridge firing controller 106 receives signals from the system indicative of the bridge output voltage, the load current, and the line to line input voltages. Further, the bridge firing controller also receives signals indicative of the gate signals applied to each thryistor in bridges 102 and 104. In the manner set forth in detail below, the bridge firing control utilizes these signals to accurately and quickly enable safe and effective transfer of power from the source to load or, in a reversing mode, from the load to the source. It should be understood that although the above described system has been illustrated to include a thyristor bridge for use in controlling a DC motor, the present invention may also be utilized in the control of cycloconverters feeding AC motors, in SCR bridges used for load commutated inverters, and in other similarly controlled rectifier bridges.

Figure 2:
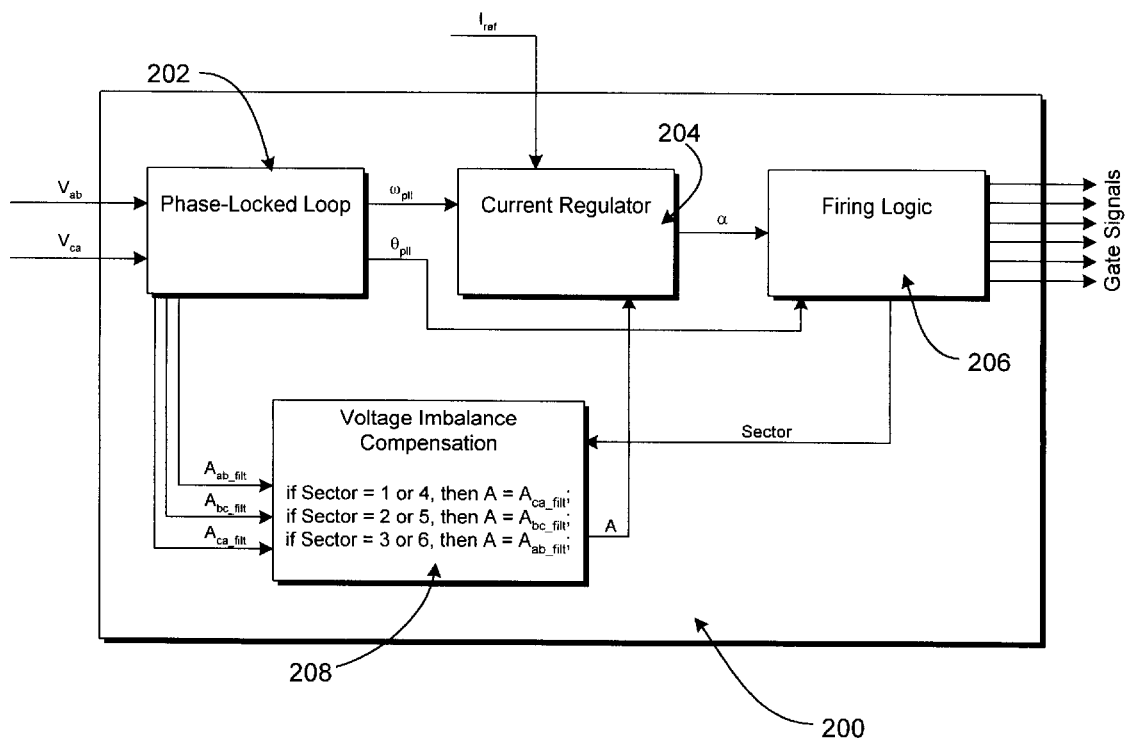
FIG. 2 is a block diagram of a firing controller according to a preferred embodiment of the present invention.

Referring now to FIG. 2, there is illustrated a block diagram of a firing controller 106 incorporating one embodiment of the voltage imbalance compensation system of the present invention. Firing controller 106 preferably includes a plurality of circuitry components generally designated by the numeral 200 operating together to provide firing control while simultaneously compensating for line voltage imbalances in the manner set forth below. In particular, a phase-locked loop (PLL) 202 periodically receives line to line voltage signals $V_{ab}$ and $V_{ca}$ representative of the line to line voltages between input lines a and b and input lines a and c, respectively. It should be understood that, since $V_{bc}=V_{ca}-V_{ab}$, the third line to line voltage signal $V_{bc}$ is easily determined using the measured signals $V_{ab}$ and $V_{ca}$. Using these measured values, the PLL 204 calculates a frequency value signal $\omega_{pll}$ and a PLL angle signal $\theta_{pll}$. Which are used by a current regulator 204 and a firing logic processor 206, respectively, in transferring current flow from one thyristor to the next.

Each of the measured values are stored in memory within the PLL 202 in an array format, such that, for example, $V_{ab}[n]$, $V_{ab}[n-1]$ . . . $V_{ab}[n-i_{d90}]$ are each preserved in memory, where n is the array variable representing the most recent measurement and $i_{d90}$ is an integer value corresponding to the array measurement closest to 90 electrical degrees from the most recent measurement. In particular, $i_{d90}$ may be defined in accordance with the following expression:

$$i_{d90} = ceil\left(\frac{\pi/2}{\omega_{pll} * T_{samp}}\right);$$

where $T_{samp}$ is the sampling period of the PLL and ceil(x) is a function returning the next highest integer value of the given expression. In this manner, the PLL 202 has access to each stored line to line voltage signal for each sampling period for the previous 90 degree interval.

In addition to the frequency and angle signals $\omega_{pll}$ and $\theta_{pll}$, the PLL 202, in accordance with a preferred embodiment of the present invention, also includes microprocessing circuitry containing an algorithm suitable for determining the value of the amplitude of each measured line to line voltage signal. In particular, the PLL circuitry, for each sampling period, determines values for $A_{ab}$, $A_{bc}$, and $A_{ca}$ using the following expressions:

$$A_{ab}[n] = \sqrt{V_{ab}^2[n] + V_{ab}[n-i_{d90}](V_{ab}[n-i_{d90}] - V_{ab}[n]\sin(\theta_d))};$$

$$A_{bc}[n] = \sqrt{V_{bc}^2[n] + V_{bc}[n-i_{d90}](V_{bc}[n-i_{d90}] - V_{bc}[n]\sin(\theta_d))}; \text{ and}$$

$$A_{ca}[n] = \sqrt{V_{ca}^2[n] + V_{ca}[n-i_{d90}](V_{ca}[n-i_{d90}] - V_{ca}[n]\sin(\theta_d))};$$

where n is the array variable and $\theta_d = 2\omega_{pll}(T_{samp}*i_{d90})$.

Following a determination of the amplitudes of each measured line to line voltage signal, the microprocessor then averages these values over the previous 90 degree interval value $i_{d90}$ to generate filtered amplitude signals $A_{ab\_filt}$, $A_{be\_filt}$, and $A_{ca\_filt}$, according to the following expressions:

$$A_{ab\_filt} = \frac{1}{i_{d90}}\sum_{k=1}^{i_{d90}} A_{ab}[k];$$

$$A_{bc\_filt} = \frac{1}{i_{d90}}\sum_{k=1}^{i_{d90}} A_{bc}[k];$$

$$A_{ca\_filt} = \frac{1}{i_{d90}}\sum_{k=1}^{i_{d90}} A_{ca}[k]$$

PLL 202, for each sampling period, outputs the above filtered amplitude values and relays them to a voltage imbalance compensation algorithm 208 associated with the PLL 202. In addition to the filtered amplitude values, the voltage imbalance compensation algorithm 208 also receives, from the firing logic 206, a sector, signal representing the current firing state of the thyristor bridge. In a preferred embodiment, a sector signal having a value of 1 indicates that thyristors 1 and 6 are on, a sector signal of 2 indicates that thyristors 6 and 2 are on; a sector signal of 3 indicates that thyristors 2 and 4 are on; a sector signal of 4 indicates that thyristors 4 and 3 are on; a sector signal of 5 indicates that thyristors 3 and 5 are on; and a sector signal of 6 indicates that thyristors 5 and 1 are on.

In practice, the voltage imbalance compensation algorithm 208 functions to select a particular filtered amplitude value ($A_{ab\_filt}$, $A_{bc\_filt}$, and $A_{ca\_filt}$) to output to the current regulator 204, thereby improving current regulator operation. The selections of an appropriate amplitude value is based upon the value of the sector signal described above and the received filtered amplitude values. In accordance with a preferred embodiment of the present invention, the voltage imbalance compensation algorithm 208 outputs a line to line voltage amplitude based upon the following conditions:

if sector=1 or 4, $A=A_{ac\_filt}$;
if sector=2 or 5, $A=A_{bc\_filt}$; and
if sector=3 or 6, $A=A_{ca\_filt}$ By utilizing a particular filtered amplitude value based upon the sector of the bridge currently firing, in addition to signals representing the command current $i_{ref}$ and the phase locked loop frequency $\omega_{PLL}$, the current regulator 204 can more accurately generate the firing angle α used by the firing logic 206 to control the firing of the individual thyristors in the bridge. The use of individual line to line filtered amplitudes enables the regulator to advance the firing angle for the phase with low voltage and retard the firing angle for the phase with high voltage. This results in improved current sharing in the system in the presence of a line imbalance.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

We claim:

1. A method for compensating for line imbalances in a thyristor bridge firing controller comprising the steps of:
   receiving a plurality of line to line voltage signals;
   calculating, based upon said plurality of line to line voltage signals, a plurality of filtered amplitude signals;
   determining, based upon a currently firing sector of said thyristor bridge, which of said plurality of filtered amplitude signals to utilize for firing control; and
   utilizing the selected filtered amplitude signal in controlling the firing of the thyristor bridge.

2. The method of claim 1, wherein said step of receiving a plurality of line to line voltage signals includes the step of receiving two line to line voltage signals, and further comprises the step of calculating a third line to line voltage signal based upon said two received line to line voltage signals.

3. The method of claim 2, wherein said step of calculating a plurality of filtered amplitude signals includes the step of calculating three filtered amplitude signals $A'_{ab\_filt}$, $A_{bc\_filt}$, and $A_{ca\_filt}$, wherein each filtered amplitude signals corresponds to one of said three line to line voltage signals.

4. The method of claim 3, wherein said steps of receiving two line to line voltage signals, calculating a third line to line voltage signals, and calculating three filtered amplitude signals are performed once during each sampling period of a micro-processor associated the firing controller.

5. The method of claim 4, further comprising the steps of:
storing, for each sampling period, values for each of said three line to line voltage signals in an array format; and
saving, for each sampling period, values for each of said three filtered amplitude voltage signals in an array format.

6. The method of claim 5, further comprising the step of:
calculating said three filtered amplitude signals $A_{ab\_filt}$, $A_{bc\_filt}$, and $A_{ca\_filt}$ in accordance with expressions having the following form:

$$A_{xy\_filt} = \frac{1}{i_{d90}} \sum_{k=1}^{i_{d90}} A_{xy}[k];$$

wherein $$A_{xy}[k] = \sqrt{V_{xy}^2[k] + V_{xy}[k - i_{d90}](V_{xy}[k - i_{d90}] - V_{xy}[k]\sin(\theta_d))};$$

$$i_{d90} = ceil\left(\frac{\pi/2}{\omega_{pll} * T_{samp}}\right); \text{ and } \theta_d = 2\omega_{pll}(T_{samp} * i_{d90}).$$

7. The method of claim of claim 3, further comprising the steps of:
receiving a sector signal indicating which thyristors are conducting in a thyristor bridge associated with said firing controller; and
selecting one of said three filtered amplitude signals $A_{ab\_filt}$, $A_{bc\_filt}$, and $A_{ca\_filt}$ to use for controlling the firing of said thyristor bridge based upon said sector signal.

8. The method of claim 7, wherein said sector signal has values according to the following expressions:
sector signal=1 if thyristors 1 and 6 are conducting;
sector signal=2 if thyristors 6 and 2 are conducting;
sector signal=3 if thyristors 2 and 4 are conducting;
sector signal=4 if thyristors 4 and 3 are conducting;
sector signal=5 if thyristors 3 and 5 are conducting; and
sector signal=6 if thyristors 5 and 1 are conducting.

9. The method of claim 8, further comprising the following steps:
selecting $A_{ab\_filt}$ if said sector signal is 1 or 4;
selecting $A_{bc\_filt}$ if said sector signal is 2 or 5; and
selecting $A_{ca\_filt}$ if said sector signal is 3 or 6.

10. A system for compensating for line imbalances in a thyristor bridge firing controller comprising:
means for receiving a plurality of line to line voltage signals;
means for calculating, based upon said plurality of line to line voltage signals, a plurality of filtered amplitude signals;
means for determining, based upon a currently firing sector of said thyristor bridge, which of said plurality of filtered amplitude signals to utilize for firing control; and
means for utilizing the selected filtered amplitude signal in controlling the firing of the thyristor bridge.

11. The system of claim 10, wherein said means for receiving a plurality of line to line voltage signals includes means for receiving two line to line voltage signals, and further comprises the means for calculating a third line to line voltage signal based upon said two received line to line voltage signals.

12. The system of claim 11, wherein said means for calculating a plurality of filtered amplitude signals includes means for calculating three filtered amplitude signals $A_{ab\_filt}$, $A_{bc\_filt}$, and $A_{ca\_filt}$, wherein each filtered amplitude signals corresponds to one of said three line to line voltage signals.

13. The system of claim 12, wherein said means for receiving two line to line voltage signals, calculating a third line to line voltage signals, and calculating three filtered amplitude signals perform once during each sampling period of a micro-processor associated the firing controller.

14. The system of claim 13, further comprising:
means for storing, for each sampling period, values for each of said three line to line voltage signals in an array format; and
means for storing, for each sampling period, values for each of said three filtered amplitude voltage signals in an array format.

15. The system of claim 14, further comprising:
means for calculating said three filtered amplitude signals $A_{ab\_filt}$, $A_{bc\_filt}$, and $A_{ca\_filt}$ in accordance with expressions having the following form:

$$A_{xy\_filt} = \frac{1}{i_{d90}} \sum_{k=1}^{i_{d90}} A_{xy}[k];$$

wherein $$A_{xy}[k] = \sqrt{V_{xy}^2[k] + V_{xy}[k - i_{d90}](V_{xy}[k - i_{d90}] - V_{xy}[k]\sin(\theta_d))};$$

$$i_{d90} = ceil\left(\frac{\pi/2}{\omega_{pll} * T_{samp}}\right); \text{ and } \theta_d = 2\omega_{pll}(T_{samp} * i_{d90}).$$

16. The method of claim of claim 12, further comprising:
means for receiving a sector signal indicating which thyristors are conducting in a thyristor bridge associated with said firing controller; and
means for selecting one of said three filtered amplitude signals $A_{ab\_filt}$, $A_{bc\_filt}$, and $A_{ca\_filt}$ to use for controlling the firing of said thyristor bridge based upon said sector signal.

17. The system of claim 16, wherein said sector signal has values according to the following expressions:
sector signal=1 if thyristors 1 and 6 are conducting;
sector signal=2 if thyristors 6 and 2 are conducting;
sector signal=3 if thyristors 2 and 4 are conducting;
sector signal=4 if thyristors 4 and 3 are conducting;
sector signal=5 if thyristors 3 and 5 are conducting; and
sector signal=6 if thyristors 5 and 1 are conducting.

18. The system of claim 17, further comprising:
means for selecting $A_{ab\_filt}$ if said sector signal is 1 or 4;
means for selecting $A_{bc\_filt}$ if said sector signal is 2 or 5; and
means for selecting $A_{ca\_filt}$ if said sector signal is 3 or 6.

19. A method for compensating for line imbalances in a power converter including a thyristor bridge, comprising the steps of:
receiving, during each sampling period of a microcontroller associated with said power converter, a plurality of line to line voltage signals indicative of input voltages received by said power converter;

calculating, during each sampling period, filtered amplitude values for each of said plurality of line to line voltage signals;

receiving, during each sampling period, a sector signal indicative of a particular sector of the thyristor bridge that is currently conducting;

selecting, during each sampling period, a particular filtered amplitude value based upon said received sector signal; and controlling firing of the thyristor bridge based upon said selected filtered amplitude value.

20. The method of claim 19, further comprising the steps of:

calculating, during each sampling period, a plurality of amplitude values corresponding to said plurality of line to line voltage signals; and averaging each of said plurality of amplitude values over a predetermined time period to generate said filtered amplitude values.

21. The method of claim 20, wherein said predetermined time period is substantially equivalent to an interval required to progress 90 electrical degrees.

22. The method of claim 20, further comprising the step of:

storing, during each sampling period, said plurality of line to line voltage signals and said plurality of amplitude values, in a memory array associated with the microcontroller.

23. A system for compensating for line imbalances in a power converter including a thyristor bridge, comprising:

means for receiving, during each sampling period of a microcontroller associated with said power converter, a plurality of line to line voltage signals indicative of input voltages received by said power converter;

means for calculating, during each sampling period, filtered amplitude values for each of said plurality of line to line voltage signals;

means for receiving, during each sampling period, a sector signal indicative of a particular sector of the thyristor bridge that is currently conducting;

means for selecting, during each sampling period, a particular filtered amplitude value based upon said received sector signal; and means for controlling firing of the thyristor bridge based upon said selected filtered amplitude value.

24. The system of claim 23, further comprising:

means for calculating, during each sampling period, a plurality of amplitude values corresponding to said plurality of line to line voltage signals; and means for averaging each of said plurality of amplitude values over a predetermined time period to generate said filtered amplitude values.

25. The system of claim 24, wherein said predetermined time period is substantially equivalent to an interval required to progress 90 electrical degrees.

26. The method of claim 24, further comprising:

means for storing, during each sampling period, said plurality of line to line, voltage signals and said plurality of amplitude values, in a memory array associated with the microcontroller.

* * * * *